(12) United States Patent
Tiedeken

(10) Patent No.: US 6,383,076 B1
(45) Date of Patent: *May 7, 2002

(54) MONITORING SYSTEM FOR PLURAL GAMING MACHINES USING POWER LINE CARRIER COMMUNICATIONS

(75) Inventor: Robert J. Tiedeken, Marlton, NJ (US)

(73) Assignee: Iverson Gaming Systems, Inc., Bala Cynwyd, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,792

(22) Filed: Sep. 29, 1997

(51) Int. Cl.[7] ............................ A63F 9/24
(52) U.S. Cl. ............ 463/40; 463/42; 463/25; 463/20; 463/16
(58) Field of Search ............ 463/39–42, 20–22, 463/25–29, 16; 340/310.01, 310.02, 310.06, 825.35, 323 R; 375/259; 273/138 A

(56) References Cited

U.S. PATENT DOCUMENTS

| | | | |
|---|---|---|---|
| 3,942,168 A | * 3/1976 | Whyte | 340/310.01 |
| 4,072,930 A | 2/1978 | Lucero et al. | |
| 4,357,605 A | * 11/1982 | Clements | 340/825.14 |
| 4,636,951 A | * 1/1987 | Harlick | 273/138.1 |
| 5,249,800 A | 10/1993 | Hilgendorf et al. | |
| 5,429,361 A | 7/1995 | Raven et al. | |
| 5,452,344 A | * 9/1995 | Larson | 340/310.01 |
| 5,630,204 A | * 5/1997 | Hylton et al. | |
| 5,892,795 A | * 4/1999 | Paret | 340/310.01 |

OTHER PUBLICATIONS

Data Sheet for National Semiconductor LM1893/LM2893 Carrier–Current Transceiver; p. 5–136 through 5–157, date unknown.

Data Sheet for Exar XR–2211 FSK Demodulator/Tone Decoder, p. 1–23 through 1–29, date unknown.

* cited by examiner

Primary Examiner—Michael O'Neill
(74) Attorney, Agent, or Firm—Akin, Gump, Strauss, Hauer & Feld, L.L.P.

(57) ABSTRACT

An apparatus for use in a gaming machine has a controller and an AC power line modem. The controller and the AC power line modem send gaming machine data to a remote host polling computer via the AC power line in response to a polling request. A bank of gaming machines, each having a controller and an AC power line modem, may communicate with the host computer via the same AC power line. The gaming machine controller is adapted to communicate with a remote host computer via a plurality of different communication media, such as an AC power line, airwaves using radio frequency, and dedicated data lines. The gaming machine controller directly receives hard counts from pay-in devices of a gaming machine and transmits the hard counts to the remote polling computer. The gaming machine controller also uses a mask list to collect only the status codes, such as error codes, which the polling computer asks it to collect and transmit.

7 Claims, 13 Drawing Sheets

MONITORING SYSTEM FOR PLURAL GAMING MACHINES USING POWER LINE CARRIER COMMUNICATIONS

BACKGROUND OF THE INVENTION

The present invention relates generally to gaming machines, and particularly to a system for monitoring the operation of gaming machines via a power line.

Gambling casinos and entertainment centers often have large numbers of individual gaming machines, such as slot machines and video gaming machines. The condition and status of these machines must be carefully monitored. Usage, pay-in/pay-out and malfunctions are some conditions that are typically monitored. Conventional gaming machines in large casino-type installations are typically monitored by a remote computer. For example, a conventional slot machine has a serial port on its game board which outputs coin, security and tracking data. The serial port of each slot machine is hardwired to a data line that runs from each slot machine to the remote computer. Some examples of gaming machine monitoring systems are shown in U.S. Pat. No. 4,072,930 (Lucero et al.); U.S. Pat. No. 5,249,800 (Hilgendorf et al.); and U.S. Pat. No. 5,429,361 (Raven et al.).

Conventional gaming machine monitoring systems require dedicated data lines for communicating condition and status information. These dedicated data lines increase the expense and complexity of gaming machine installations.

Gaming machines may include controller boards for collecting and transmitting slot machine information to a remote computer. Controller boards are typically designed for a hardwire application so that gaming machine data can be communicated to a remote computer via the dedicated data line discussed above. These controller boards usually cannot be easily reconfigured to handle a different type of remote communication medium, such as wireless communications.

Conventional controller boards also do not have the ability to pass on a true image of the machine's hard meters to the remote computer because they typically do not obtain the count data directly from the pay-in devices. Conventional controller boards are also typically not flexible in their ability to filter out status data which is not of interest to the gaming facility. The controller boards therefore transmit large amounts of unnecessary status information to the remote computer.

Accordingly, there is a need for a gaming machine monitoring system which does not require a dedicated data line between the slot machines and the remote computer, which has a controller board that can flexibly interface with a plurality of different communication media, which can obtain reliable currency count data and which can selectively collect and transmit status data. The present invention fulfills such needs.

BRIEF SUMMARY OF THE INVENTION

An apparatus for use in a gaming machine comprises a controller and an AC power line modem. The controller includes a memory for storing data generated by the gaming machine. The AC power line modem is connected to the controller and is adapted to be connected to an AC power line for allowing data from the memory to be communicated to the AC power line. A plurality of such gaming machines may be connected to a remote host polling computer via a single AC power line.

The AC power line modem includes a drive circuit and a power line carrier transceiver. The drive circuit is connected to the AC power line for transmitting data to, and receiving data from, the AC power line. The power line carrier transceiver is connected to the drive circuit and to the controller. The transmitted data includes the data stored in the controller memory. The received data includes a polling signal requesting that the controller transmit the data stored in its memory.

Another embodiment of the invention provides a gaming machine controller adapted for communication with a remote host computer via a plurality of different communication media. The controller comprises a first connector for attachment to a gaming machine to allow the controller to receive data generated by the gaming machine, a memory for storing the gaming data, and a data router connected to the memory for communicating the gaming data to the remote host computer. The data router includes a programmable device for setting a communication mode therein to allow the controller to communicate via one communication medium selected from the plurality of different communication media.

Another embodiment of the invention provides a gaming machine controller adapted to collect data from a gaming machine and connected to at least one pay-in device of the gaming machine. Each pay-in device includes a hard meter which generates hard counts representative of currency entered therein. The controller comprises an input port directly connected to each pay-in device for receiving the hard counts, a memory for storing the hard counts, and an output port connected to the memory for allowing the hard count data stored therein to be output from the controller and transmitted to a remote computer. The remote computer thereby receives pay-in data obtained directly from the hard meter of each pay-in device.

Another embodiment of the invention provides a gaming machine controller adapted for communication with a remote host computer. The controller comprises an input port for receiving status codes from the gaming machine, a mask for storing a list of status codes which are desired to be transmitted to the remote host computer, a memory for storing status codes, and a processor. The processor is connected to the input port, the mask and the memory for causing the memory to store the status codes received from the gaming machine which are on the mask list, and for causing the controller to transmit to the remote host computer only the status codes which are on the mask list.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
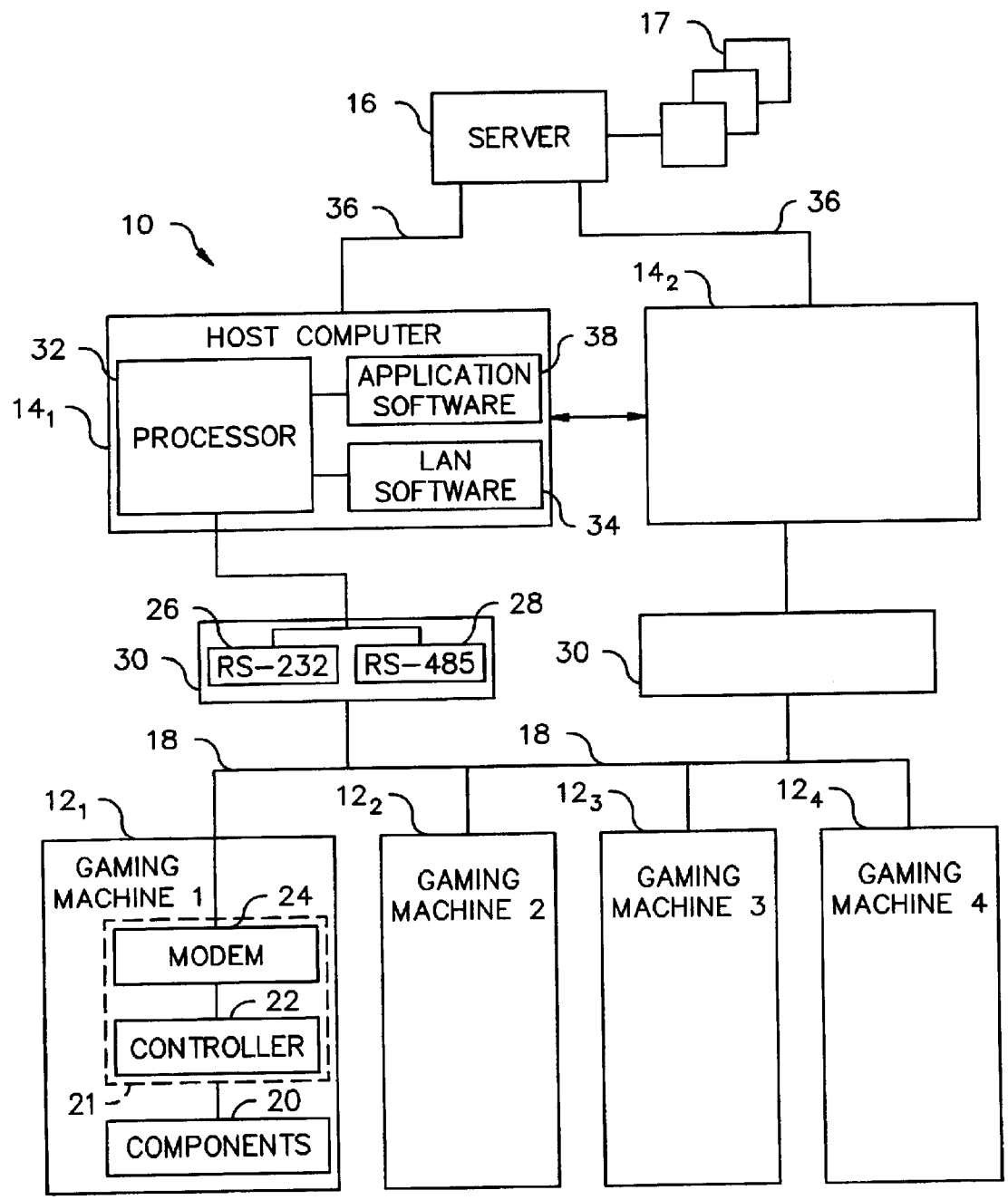
FIG. 1 is a schematic block diagram of a gaming system for linking a plurality of gaming machines to remote monitoring computers, in accordance with a preferred embodiment of the present invention.

Certain terminology is used herein for convenience only and is not be taken as a limitation on the present invention. In the drawings, the same reference numerals are employed for designating the same elements throughout the several figures.

FIG. 1 shows a schematic diagram of gaming system 10. The system 10 includes a plurality of gaming machines 12, one or more remote polling or host computers 14, and a central server 16 connected to one or more user interfaces or workstations 17. An important feature of the invention is that the gaming machines 12 are connected to the one or more host computers 14 via a single AC power line 18 which provides bidirectional communication of data therebetween. The AC power line which supplies electrical power to the gaming machines 12 and to the host computers 14 is the same line as the AC power line 18. In this manner, it is not necessary to provide a separate communication medium between the gaming machines 12 and the host computers 14, as required in conventional gaming systems.

If there is only one host computer 14, all of the gaming machines 12 are connected to the single host computer 14. If there are plural host computers 14, each gaming machine is assigned to a set, and each set is assigned to a particular host computer 14. For example, there are two sets of gaming machines 12 in FIG. 1, and each set is assigned to one of the two host computers 14. In particular, gaming machines $12_1$ and $12_2$ are assigned to host computer $14_1$, and gaming machines $12_3$ and $12_4$ are assigned to host computer $14_2$. An actual commercial configuration may have up to 64,000 gaming machines 12 assigned to a single host computer 14.

In an alternative embodiment of the invention, each host computer 14 can poll every gaming machine 12. In a plural host computer configuration, a single host computer 14 may be designated to poll all of the gaming machines 12, and the other host computers 14 may be used for different functions, such as slot accounting or alarms.

The host computers 14 periodically poll the gaming machines 12 to have data sent from the gaming machines 12 to the respective host computers 14. All of the gaming machines 12 may be connected to a single AC power line 18. To minimize the risk of polling signal interference, the host computers 14 are linked together, and the polling functions of the host computers 14 are coordinated so that only a single host computer 14 transmits a polling signal over the power line 18 at any instance of time. This feature is implemented by using a lock file, as discussed below with respect to the polling protocol (FIGS. 8A–8F).

Each gaming machine 12 includes the necessary gaming hardware/software, inputs, displays, card readers, coin inputs, and the like (collectively referred to as "components 20") for the particular game being played. The components 20 are conventional, and thus are not shown or described in detail. The components 20 of each gaming machine 12 are connected to an apparatus 21 which includes a controller 22 and an AC power line modem 24. The controller 22 is connected at one end to the components 20, and at the other end to the modem 24. In turn, the modem 24 is connected to the AC power line 18. The controller 22 and the modem 24 are described in detail below with respect to FIGS. 2–3. The apparatus 21 may be external or internal to the gaming machine 12, and may operate in place of a conventional gaming machine controller.

Each host computer 14 includes a processor 32 and application software 34. The processor 32 may be any general-purpose computer or may be a specialized computer. The processor 32 executes the application software 34. The polling functions of the application software 34 are described in detail below with respect to FIGS. 8A–8E.

Each host computer 14 is connected to an external AC power line modem 30 (which is similar to the modem 24 of the gaming machine 12) through RS-232 or RS-485 ports 26, 28 associated with the modem 30. Thus, the AC power line modem 30 is connected at one end to the AC power line 18 and at the other end to the processor 32. Alternatively, the modem 30 may be internally mounted in the host computer 14.

Each host computer 14 is connected to the server 16 via a wired or wireless local area network (LAN) 36. Each host computer 14 is thus a node on the LAN 36. Each host computer 14 further includes LAN software 38 for converting signals transmitted to, and received from, the server 16 via the LAN 36.

The embodiment shown in FIG. 1 has a single, isolated AC power line 18. However, there may be plural power lines 18 connecting each set of gaming machines 12 to their respective host computer 14. In the plural power line embodiment, plural host computers 14 may simultaneously poll their respectively connected gaming machines 12.

Power Line Modem

An important feature of the invention is the power line modem 24, 30 (hereafter, "modem 24") which allows for bidirectional communication between the host computer 14 and each of the gaming machines 12 solely via the AC power line 18. AC power line modems, per se, are conventional. However, the particular environment of the modem 24 in the system 10 necessitated a novel approach to the design of such a modem. Thus, the modem 24 includes a combination of conventional and non-conventional components.

Figure 2:
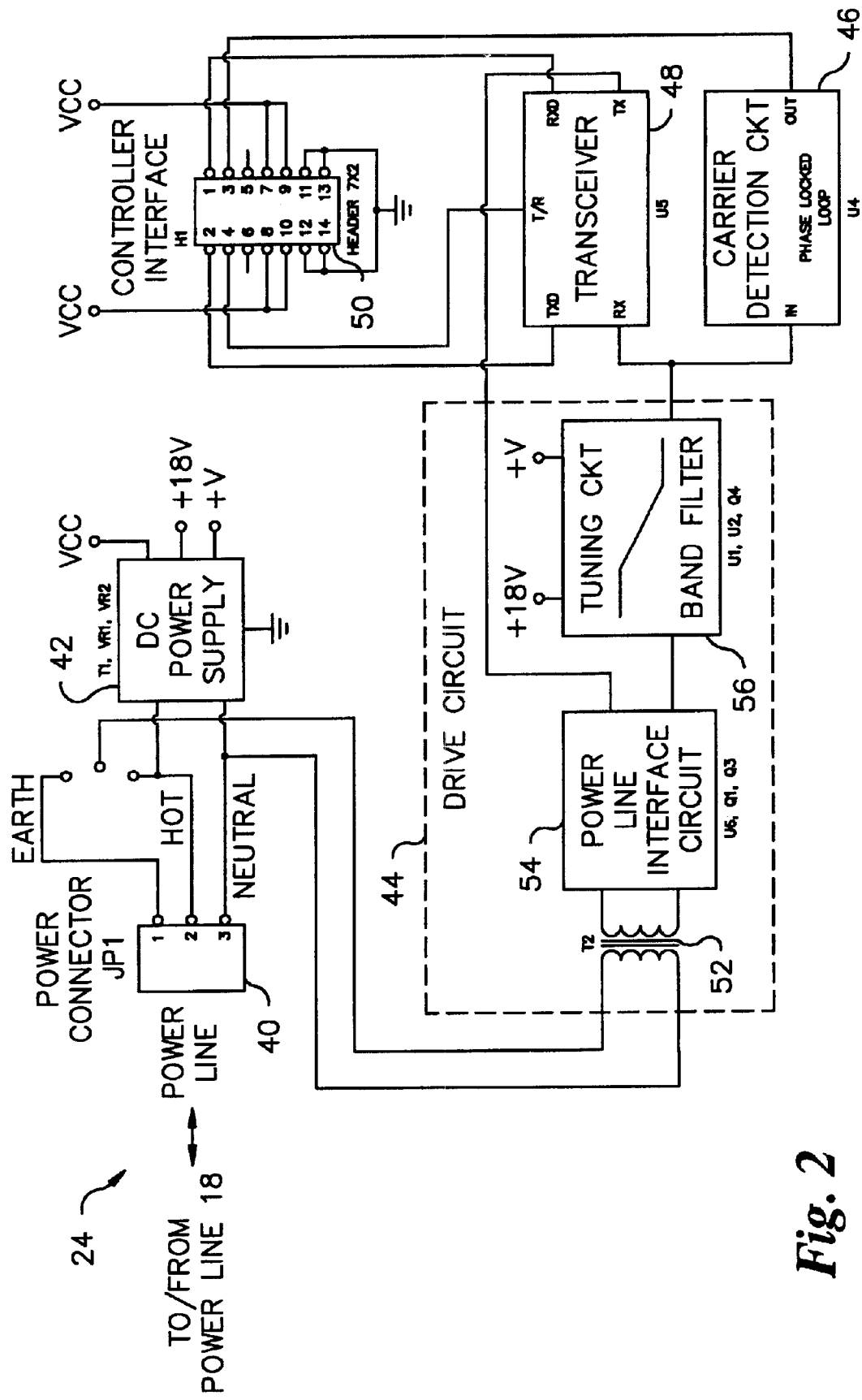
FIG. 2 is a circuit board schematic block diagram of a power line modem for use in the gaming machines of FIG. 1.
Figure 3:
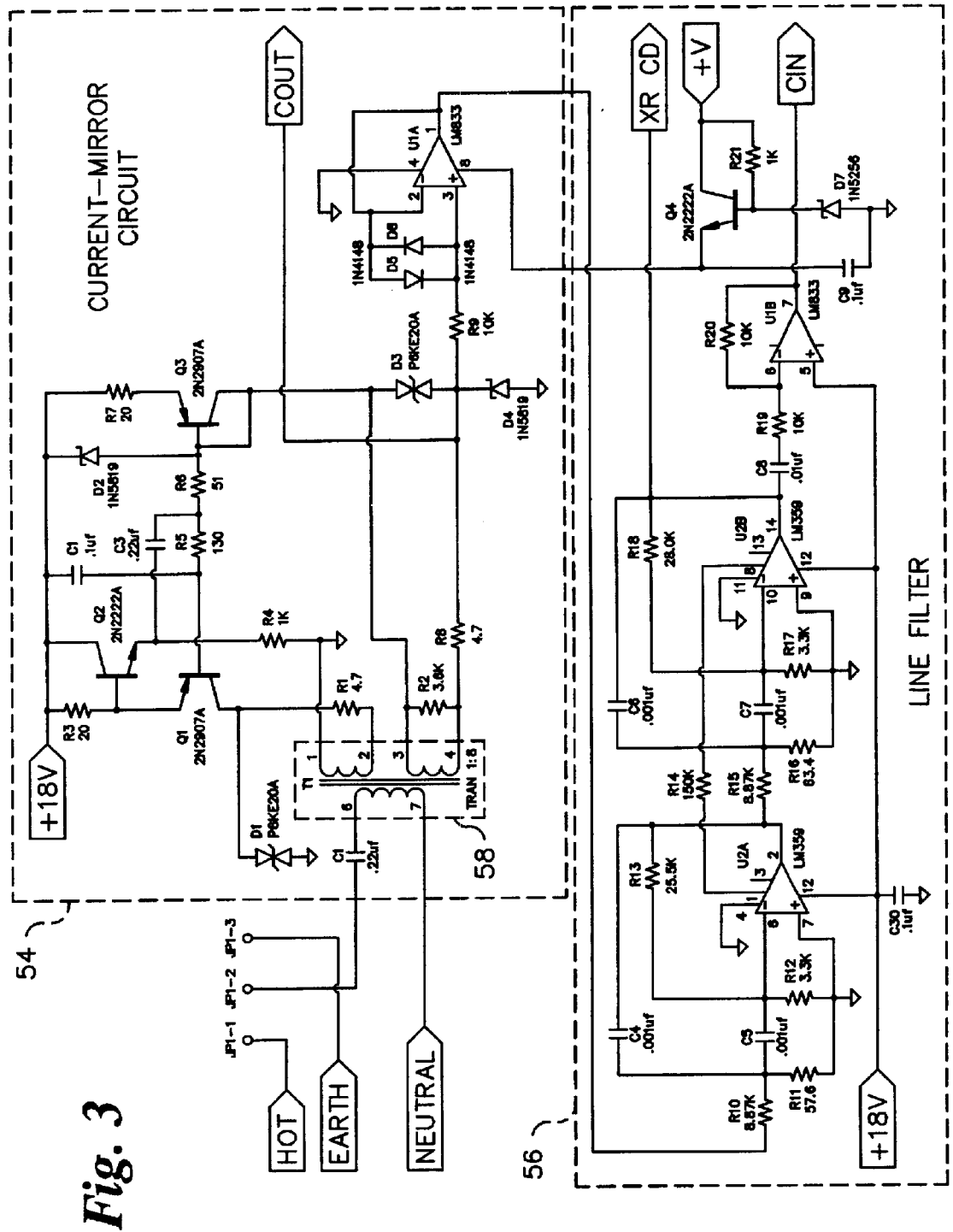
FIG. 3 is a circuit diagram of portions of the power line modem of FIG. 2.

FIG. 2 shows an overall schematic block diagram of the modem 24. FIG. 3 shows a detailed block diagram of selected portions of the modem 24. Since the modem 24 is used for receiving and transmitting data, the inputs of some modem components during a receive mode become the outputs in a transmit mode, and visa-versa. For convenience, FIG. 2 is described with respect to a receive mode, and any special considerations regarding the transmit mode are discussed where appropriate.

Referring to FIG. 2, the modem 24 includes a power connector 40, a DC power supply 42, a drive circuit 44, a carrier detection circuit 46, a power line transceiver 48 and a controller interface 50. One preferred transceiver 48 is a National Semiconductor LM1893/LM2893 power line carrier transceiver which is suitable for narrow band communication. The embodiment of the invention disclosed herein uses narrow band communication. However, the invention may also be implemented with spread spectrum communication. One preferred carrier detection circuit 46 is an XR-2211 FSK Demodulator/Tone Decoder, available from Exar Corporation, Fremont, Calif. The XR-2211 and related circuitry is preferred over an LM567 carrier detection chip and related circuitry shown in the LM1893/LM2893 application sheet because the XR-2211 is especially designed for data communications and has much tighter specifications than the LM567 chip.

The drive circuit 44 includes a transformer 52 for interfacing with the power line 18, a current mirror circuit 54 for driving the transformer 52, and a tuning circuit or bandpass filter 56 for discriminating between valid data and any other type of data present on the AC power line 18. The current mirror circuit 54 and filter 56 are shown in more detail in FIG. 3.

Referring to FIG. 2, the power connector 40 provides the source of AC electrical power, and also provides a path for the modem 24 to transmit and receive data through the existing AC wiring (i.e., through the power line 18). Jumpers are provided for allowing data to be transmitted and received on either neutral and earth wires or on neutral and hot wires. AC power on the neutral and hot leads of the power connector 40 are input to the DC power supply 42 which provides +5V, +18 V, +V (~20V) and ground. These DC voltages are used to power the logic on modem and controller boards, as well as to power the display and card reader of the gaming machine components 20.

Referring to the drive circuit 44, the transformer 52 provides coupling with the AC power line 18. The transformer 52 supplies power to the modem 24, and to the controller 22 (through interfaces described below).

Referring to FIG. 3, a special transformer 58 which has separate transmit and receive windings is used for line coupling. The separate windings allows the modem 24 to isolate the bandpass filter 56 on the receive winding and to separate the transmit and receive data paths. The application sheet for the LM1893/LM2893 transceiver shows a tuned-tank circuit for line coupling. This design is not suitable for the present invention because the system 10 presumes that many modems 24 are placed in close proximity to each other (e.g., consider a line or cluster of gaming machines 12). If a tuned-tank circuit is used in adjacent modems 24, a tugging effect occurs which can detune one or several of the modems 24 which are close to each other. The specially wound transformer 58 does not suffer from this problem.

To further clarify the functions of the transformers 52 and 58, the transformer 52 is part of the modem interface circuitry, whereas the transformer 58 provides DC power for the modem 24 and the controller 22. Both transformers 52 and 58 are connected on the power line side. Only the primary sides of both transformers 52 and 58 are common. Data and carrier signals pass through the transformer 58.

The current mirror circuit 54 allows data to be put onto the AC power line 18 (transmit mode) and extracted from (receive mode) the AC power line 18. The current mirror circuit 54 is thus a power line interface circuit. The current mirror circuit 54 compensates for variances in line impedance to help the modem 24 maintain a strong signal level. One preferred implementation of the current mirror circuit 54 is shown in the upper half of FIG. 3. The output of the current mirror circuit 54 (in the receive mode) is sent to the bandpass filter 56. The bandpass filter 56 only passes through to the transceiver 48 signals received by the drive circuit 44 that have frequencies around or near the carrier frequency. One bandpass filter 56 suitable for use with the present invention is shown in the lower half of FIG. 3. This filter 56 is used in addition to the filter circuit which is part of the LM2893 transceiver.

In the receive mode, signals passed by the filter 56 are received by the transceiver 48 and converted to the appropriate form for outputting to the controller 22. Typically, analog data is taken off the AC power line 18 and converted by the transceiver 48 to digital information for use by the controller 22. In the transmit mode, digital data is received by the transceiver 48 from the controller 22, converted by the transceiver 48 to analog data, and sent to the drive circuit 44 to be put onto the AC power line 18

In the preferred embodiment of the invention, the receiver of the transceiver 48 continuously listens until it recognizes an incoming message, and then it switches to the transmit mode to respond.

Referring again to FIG. 2, signals passed by the filter 56 are also received by the carrier detection circuit 46 which is a phase-locked loop (PLL) circuit that is a free-running oscillator. When a signal is present on the line (i.e., at the output of the filter 56), the circuit 46 tries to lock to the incoming frequency. If the signal frequency is within the capture range of the circuit 46, phase lock occurs and the circuit 46 outputs a signal to communicate to the controller 22 that data is present on the line. When using Exar's XR-2211 for implementing the carrier detection circuit 46, the output is "high" when data within the detection band is present, and the output is "low" when no data is present or when no carrier within the detection band is present. An AC power line is an extremely noisy environment. The carrier detection circuit 46 prevents the controller 22 from constantly looking at data on the line which is not associated with a transmission intended for the controller 22.

The modem 24 further includes a controller interface 50 which is a 7×2 header for providing a communications interface for data and control signals that pass between the modem 24 and the controller 22. DC power is provided on this connector.

Communication

Each controller 22 in the system 10 is assigned a predetermined address. In a receive mode, the modem 24 receives a carrier signal containing address information. The modem 24 detects whether the received signal is valid, and if so, the signal is output for processing by the controller 20. Typically, the data is a polling signal requesting that a particular controller 22 output game data stored in its memory to the modem 24 for transmission to the host computer 14 via the AC power line. The controller 22 determines whether the polling signal is meant for it or is meant for a different controller 22. If the polling signal is meant for the particular controller 22, the data stored therein is released for transmission back to the host computer 14. If the polling signal is not meant for the particular controller 22, the controller 22 does not respond. Details of the communication protocol are provided in the Appendix.

Controller

Another important feature of the present invention is the controller 22. The controller 22 uses a general purpose micro-controller design. However, the controller 22 is specially designed so that it may be used in a wide range of applications. Conventional gaming machines are typically designed for either a hardwire controller application or for a radio frequency (RF) controller application. In the hardwire application, machine data is collected by a controller and sent by the controller over copper wire (separate from the power line) directly to a host computer. In an RF application, machine data is collected by a controller and sent by the controller over airwaves to the host computer. If conversion from one application to the other is desired, the controller must be entirely redesigned. In contrast to conventional controllers, the controller 22 provides a single universal interface that may be used with a conventional gaming machine, and which may be used in a (1) a hardwire mode, (2) an RF mode, or (3) power line mode. That is, the same physical controller 22 may be used in any of the three applications within the same system network. Mixing of applications may also occur. A more detailed explanation this feature is described below with respect to FIG. 5.

The controller 22 also incorporates a specialized interconnect which is designed to improve the integrity of the data collected from the gaming machine 12 and to improve the efficiency of communication of the data to the polling host computer 14. A more detailed explanation of the specialized interconnect aspect is described below with respect to FIGS. 6 and 7.

Figure 4A:
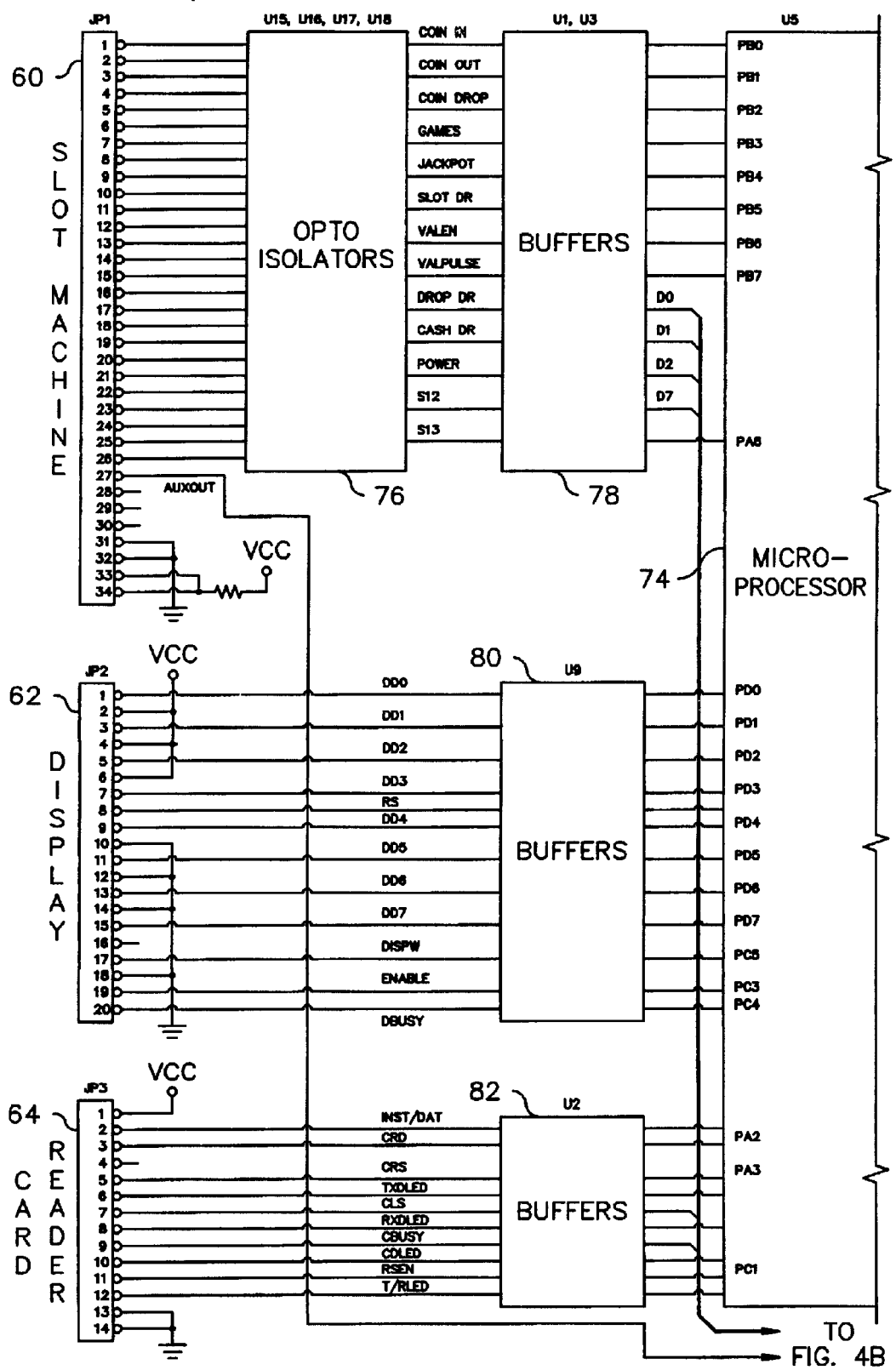
FIGS. 4a and 4b are a circuit board schematic block diagram of a controller for use in the gaming machines of FIG. 1.
Figure 4B:
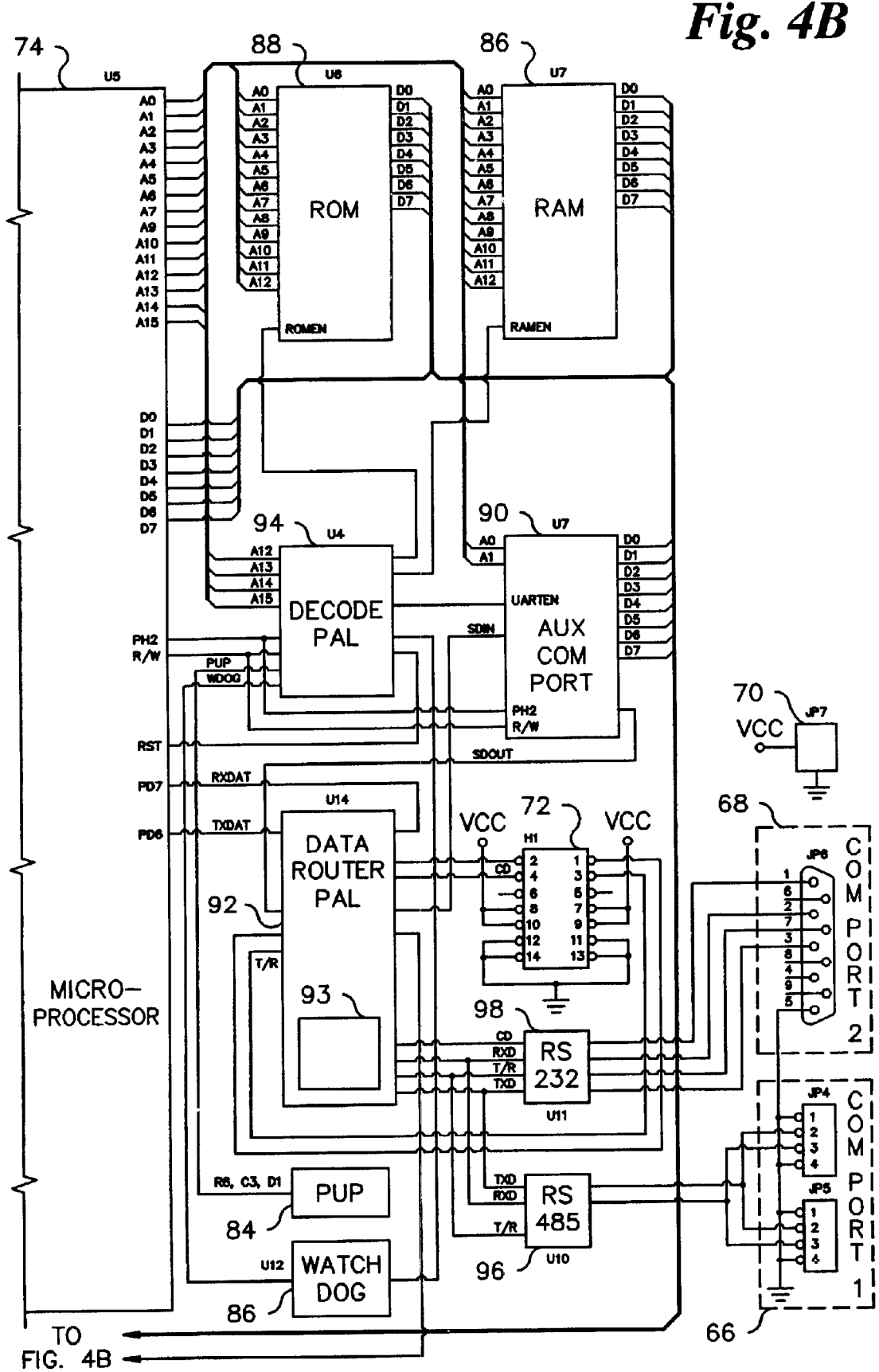

FIGS. 4a and 4b show a block diagram of the controller 22 used for connection to a gaming machine 12 in the form of a slot machine having a display and a card reader. The slot machine, display and card reader are conventional, and thus are not shown or described further. One end of the controller 22 has three connectors JP1, JP2 and JP3 (respectively labeled as 60, 62 and 64) for connection to a mating slot machine connector, a display module and the card reader, respectively. The other end of the controller 22 has connectors and ports for allowing the controller 22 to be used in a hardwire mode, an RF mode, or a power line mode. Two communication ports, COM PORT 1 and COM PORT 2, respectively labeled as 66 and 68, and a DC power connector 70 are used only when the modem 24 is not required, such as in the hardwire mode. A modem interface 72, which is a 7×2 header, interfaces with the controller interface 50 of the modem 24 for providing a communications interface for data and control signals that pass between the modem 24 and the controller 22. DC power for the controller 22 is provided on this connector. The modem interface 72 is used for either the RF or power line mode.

The controller 22 is preferably implemented on a single board which can be plugged into the gaming machine 12. The controller 22 functions are implemented by a microprocessor 74. In one preferred embodiment of the invention, the microprocessor is a 6501Q microcontroller, available from Rockwell International in California which has four 8 bit parallel ports, a serial communications interface, two 8 bit timers and 4 edge triggered interrupts. The 6501Q is configured in the extended-memory mode during initialization so that its full 64K of memory space may be used. The embodiment of the invention described herein uses 8K of RAM and 8K of ROM. The other addressing space is used for addressing peripheral devices. Components of the controller 22 are described in more detail below. JP1 Slot Machine Interface (connector 60)—JP1 is provided for interfacing to the vital output signal points of the slot machine. The output signals are optically coupled via opto-isolators 76 to the controller 22. JP1 provides both sides of the opto-coupler's bidirectional diodes for signal monitoring. The signals on the opto-coupler's output transistors are buffered by buffers 78 in a 74HCT541 driver chip, and are presented to the microprocessor's parallel ports (PA, PB). These signals are read by the microprocessor 74 once every millisecond to determine their state. One output signal is made available on JP1 (AUXOUT) for potential use.

JP2 Display Interface (connector 62)—JP2 provides the necessary outputs for driving the display module located in the card reader housing. This makes it possible for the controller 22 to interface with various types of vacuum fluorescent (VFD) displays. The output signals that drive JP2 are buffered by buffers 80 in a 74HCT541 driver chip, which protects the microprocessor's parallel ports (PC, PD) that source these signals.

JP3 Card Reader Interface (connector 64)—JP3 provides the interface to a player identification card, such as a magnetic stripe card reader, a holerith card, a smart card, or the like. These signals are buffered by buffers 82 in a 74HCT541 driver chip before they are presented to the microprocessor's parallel ports (PA, PC).

Microcontroller (microprocessor 74) resets—There are two different resets to the microcontroller. The first reset is a power-up reset timer (PUP) 84 which holds the microcontroller reset for approximately 25 msec after the +5V supply has reached +5V. The second reset is a watchdog circuit 86 which uses an external timing circuit that is held reset when the program is executing properly. This is accomplished by decoding an address that is read during the interrupt routine (which lasts for 1 msec). If the microcontroller fails to read this address, the timer will timeout and will generate a reset to the microcontroller.

RAM Memory 86—In the embodiment of the invention described herein, the controller 22 requires about 8K of RAM for temporary storage. The RAM is battery-backed to maintain its data in a power failure. This battery-backup is particularly important for preserving Player and Alarm information, coin activity, controller identification data, and the like, during a power outage and in periods when the polling system is not operable.

ROM Memory 88—In the embodiment of the invention described herein, the controller's microcode occupies approximately 6.5K of the current 8K space provided. The microcode is the operating code for the controller 22 and is written in assembly language.

Aux COM Port UART 90—Space is provided for a second UART which can interface with COM Port 1, COM Port 2, JP1 or H1 (modem interface 72). This allows for greater flexibility when a second communications interface is needed.

Data Router PAL 92—This programmable array logic (PAL) chip provides the flexibility in the configuration of the communication interfaces. The PAL allows data to be routed to and from either (1) the Aux COM port UART 90, the COM Ports 1 and 2 (66 and 68), and the slot machine interface 60, or (2) the modem interface 72 and the slot machine interface 60. The data router includes a programmable device 93 which has settings that are initially blank, and which are programmed upon installation to route the output data to the appropriate locations (1) or (2) above.

Decode PAL 94—This PAL chip decodes the address of the memory chips and peripherals, and provides an easy way to expand memory to a full 64K.

COM Port 1 (66)—This port includes JP4 and JP5 which are RJ-11 connectors. These connectors provide an RS-485 port interface 96 for hardwire applications. Two RJ-11 connectors are provided for daisy-chaining one device to another. This circuit drives 128 devices without a repeater.

COM Port 2 (88)—This port includes JP6 which is a DB9 subminiature 'D' connector which provides an RS-232 port interface 98 for hardwire applications.

DC Power Connector 70—JP7 provides DC power (+5V and ground) to the controller 22 for hardwire applications.

modem interface 72—As discussed above, the modem interface 72 provides a means of interfacing a logic board for either power line or RF applications. Tx and Rx data from the microcontroller, along with two control signals CD and T/R provide the communications interface with the attached modem board (i.e., modem 24). The modem board also provides +5V and ground to power the controller board (i.e., controller 22).

Multipurpose Controller/Data Router PAL 92

Figure 5:
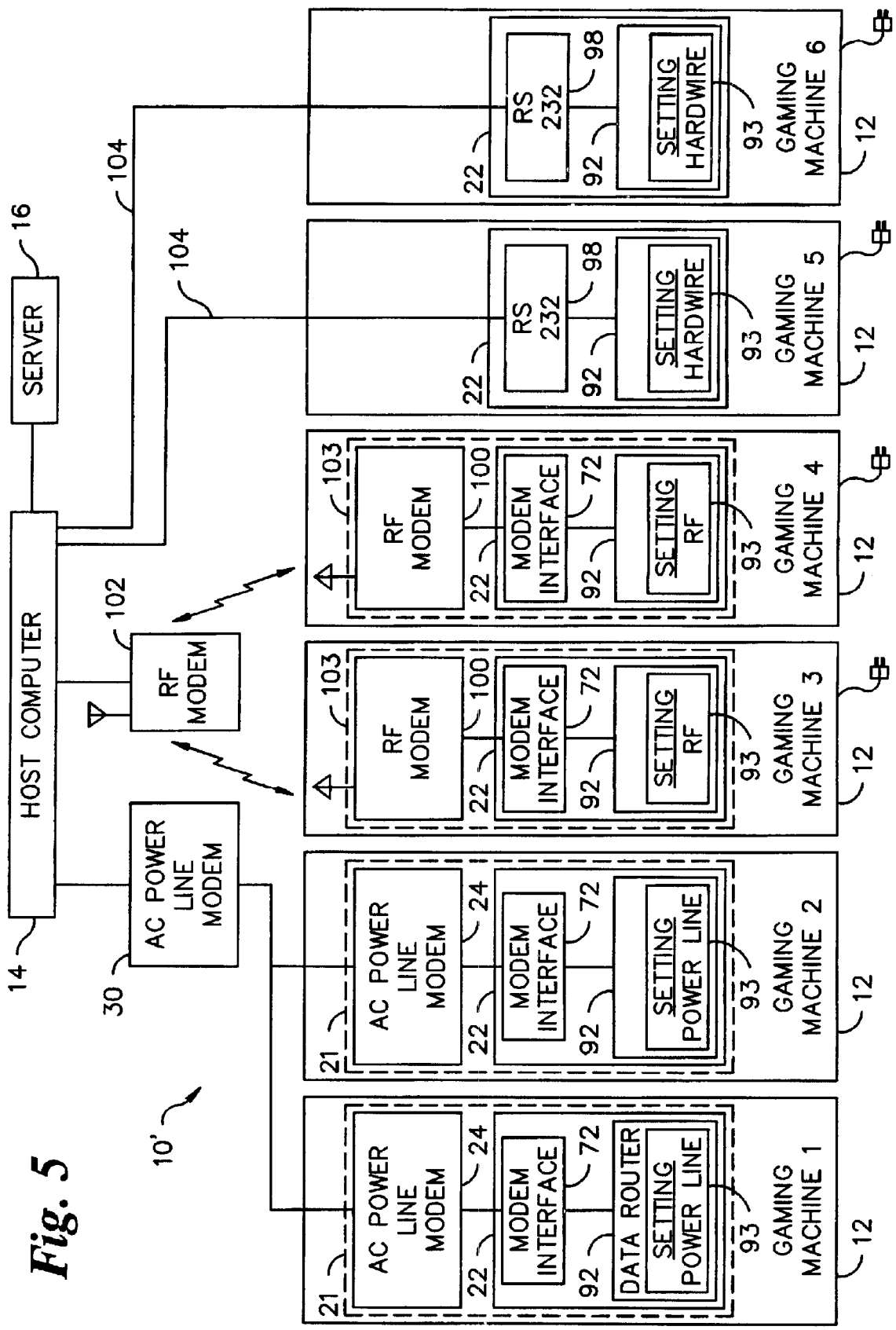
FIG. 5 is a schematic block diagram of a network of gaming machines which use different types of communication media.

FIG. 5 shows an example of a gaming system 10' which uses a mixture of different types of communication media between the gaming machines 12 and a host computer 14. FIG. 5 also illustrates how the data router PAL 92 is used to provide this capability. For ease of illustration, only one host computer 14 and only six gaming machines 12 are shown in FIG. 5.

The gaming machines 1 and 2 communicate with the host computer 14 via the AC power line 18 in the same manner as shown in FIG. 1 and described above. Gaming machines 3 and 4 communicate with the host computer 14 via RF modem 100 associated with apparatus 103 of the gaming machines 3,4 and RF modem 102 associated with the host computer 14. The modems 100 are used in place of the game machine AC power line modems 24, and the modem 102 is used in place of the AC power line modem 30 located at the host computer 14. Gaming machines 5 and 6 communicate with the host computer 14 via conventional hardwire data lines 104, such as copper wire lines. The gaming machines 3–6 are plugged into AC outlets (not shown) to provide power for the machines 12 and their controllers 22 and RF modems 100 (gaming machines 3 and 4 only). The AC power line connected to the gaming machines 3–6 is not used for data communication.

As discussed above, the controller's modem interface 72 is used for the power line and RF modes, and the RS-232 or RS-485 ports are used for the hardwire mode. Accordingly, the output of the data routers 92 in each of the gaming machines 1–4 is connected to modem interfaces 72, whereas the output of the data routers 92 in each of the gaming machines 5 and 6 is connected to RS-232 ports 98 (alternatively, RS-485 ports 96). To accomplish the desired routing, the setting in the programmable device 93 of the data router 92 in each gaming machine 1–6 is programmed upon installation, as follows:

Machines 1, 2—power line mode
Machines 3, 4—RF mode
Machines 5, 6—hardwired mode The data routing resulting from a selection of the power line mode or the RF mode is the same, since both modes cause communication to occur through the modem interface 72.

During operation of the gaming system 10', the host computer 14 does not need to know what type of communication medium is being used for each of the gaming machines since the data communication protocol for all three mediums is identical. The communication medium is thus transparent to the host computer 14. Gaming machines 12 may be switched from one communication medium to another without requiring any reprogramming of the host computer application software 38. If desired, two communication media may be simultaneously selected.

To better understand the practical advantage of such a scheme, consider a hypothetical gaming facility, such as a facility installed on a cruise ship. The gaming facility might have a dedicated gaming room of game machines, represented in FIG. 5 by gaming machines 1 and 2. Since these gaming machines are permanently installed in an enclosed and specially built environment, an AC power line communication medium may be suitable. The gaming facility might also have gaming machines 3 and 4 that are constantly moved throughout the day so as to be kept close to changing activity centers. An RF communication medium would be a good choice for such machines. The gaming facility might also have gaming machines 5 and 6 that are permanently installed in locations which are unsuitable for power line communication, due to environmental factors, excessive surrounding electrical noise, or security concerns. A hardwire communication medium would be the best choice for such machines. The controller 22 provides the flexibility to use any of these communication media without having to make significant hardware and/or software modifications to the gaming machines 12.

Specialized Interconnect

As noted above, the controller 22 is also specially designed to improve the integrity of the data collected from the gaming machine 12 and to improve the efficiency of communication of the data to the polling host computer 14.

Conventional slot machine controllers interface with the slot machine's serial output port. Depending upon the software which is loaded into the slot machine, the serial output port may be used to obtain coin, security and tracking data. Numerous problems exist when connecting conventional controllers to existing slot machines. One problem is that tracking data can only be obtained if special, upgraded firmware is installed in the slot machine. The upgraded firmware costs about $1,000 per machine. Another problem is that the soft count is not 100% reliable, compared to the hard meter, and thus adds a potential source of error to the outputted gaming data. For example, the firmware receives signals from mechanical (hard) meters and a bill validator, processes the signals using a combination of software and hardware, and provides formatted output data to the serial output port. The formatted output data includes "soft counts" which represent the pay-in amount, as determined by the firmware. The controller receives the formatted output data from the serial output port and passes it on to the host computer. If there is a malfunction or error in the firmware, the hard meter data or bill validator data passed on to the host computer will not reflect the actual slot machine pay-in amount. In practice, the soft counts output by the firmware frequently do not match the mechanical meter readings. Such errors cannot be tolerated because gambling facilities must have a highly accurate accounting of the pay-in amounts as matched to the hard meters to properly track revenue.

Another problem with conventional controllers is that a large amount of data received at the serial output port is not necessary. For example, a large amount of data relates to machine maintenance status and redundant communication protocol information. Crucial data, such as pay-in and pay-out data, represents only a small fraction of the data received by the controller. Nonetheless, conventional controllers transmit all or most of this data to the host computer, and the host computer is programmed to cull through the data for the crucial portions. As a result, the communication process is needlessly complex and time-consuming.

Figure 6:
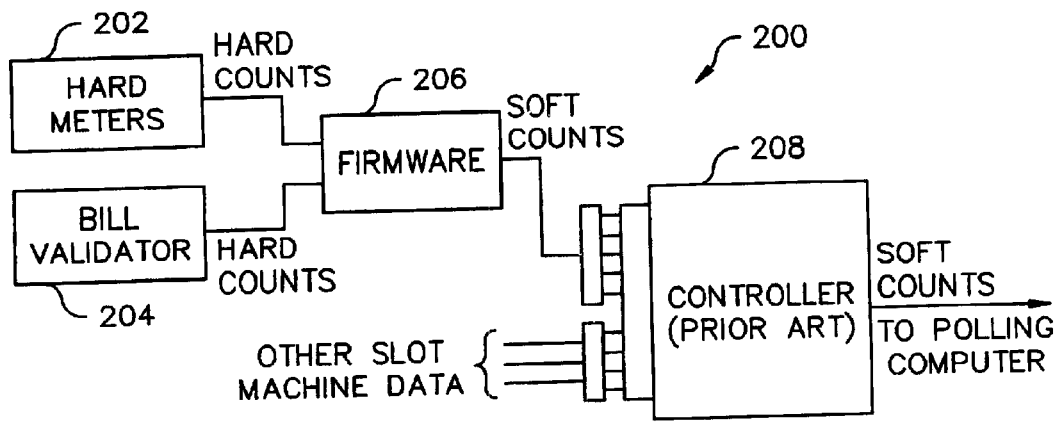
FIG. 6 is a schematic block diagram of a data collection scheme in a conventional gaming machine.

FIG. 6 shows a schematic block diagram of a conventional data collection scheme 200 in a gaming machine with upgraded firmware, as discussed above. Hard count outputs from hard meters 202 and bill validator 204 are sent to firmware 206, which, in turn, outputs soft counts to a conventional controller 208. Other slot machine data is fed directly into the controller 208.

Figure 7:
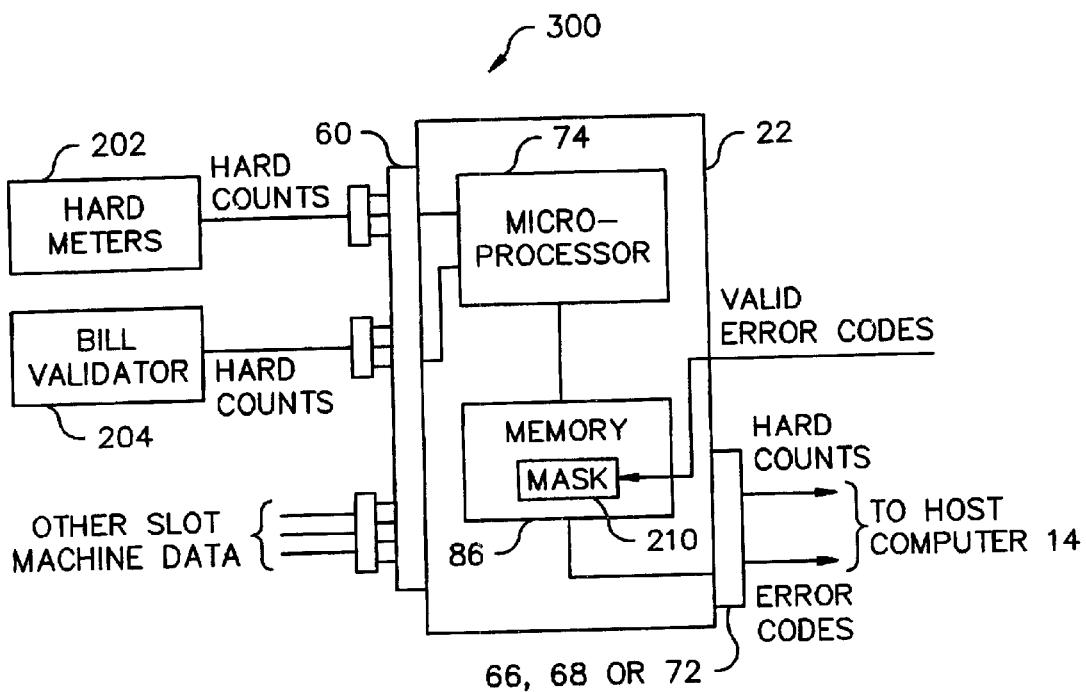
FIG. 7 is a schematic block diagram of a data collection scheme in accordance with a preferred embodiment of the present invention.

FIG. 7 shows a schematic block diagram of a data collection scheme 300 in accordance with the present invention. In contrast to FIG. 6, the hard count outputs of the hard meters 202 and the bill validator 204 are connected directly to the controller 22. In this manner, the controller 22 obtains a direct copy of the mechanical meter readings in the pay-in devices. The microprocessor 74 is programmed to differentiate the data signals from the hard meters 202 and bill validator 204, and to pass on the data to its host (polling) computer 14, when requested. No extra firmware is required in the scheme of FIG. 7, and the host computer 14 can obtain hard counts, not the less reliable soft counts provided by conventional firmware add-ons connected to pay-in devices.

Furthermore, the present invention provides a filtering or masking process to address the problem discussed above wherein excessively large amounts of non-crucial data are collected from gaming machines by the controller and transmitted to the host computer.

A large number of error codes and status codes are generated during operation of slot machines. One conventional slot machine manufactured by Bally Manufacturing Corp. outputs over 100 different status codes, including normal report codes and error codes. Error codes may be maintenance alert codes, security alert codes, floor attention codes and abnormal revenue codes. These codes are generated by a conventional slot machine using the SDS serial port interface and are reported to the controller through the slot machine's game card serial port. Conventional controllers thus store all of the codes received from their respective gaming machines, and transmit all of the stored codes to the host computer when polled. Some of the error codes contain crucial information which should be immediately transmitted. However, some of the codes need not be communicated during every poll. Other codes need not be communicated at all, since the conditions that they report are either not of interest to the facility, or because the conditions can be monitored in some other manner. The masking feature of the present invention allows the facility manager to select which codes to report, and which codes to mask out.

FIG. 7 shows the masking feature. A list of valid serial port error codes are received in a mask 210 located in the controller's memory 86. Preferably, the host computer 14 sends out the list of valid codes to the controller 22. Alternatively, the list may be preprogrammed into the controller 22. During operation of the gaming machine 12, each error code received by the microprocessor 74 is checked against the mask list and discarded if it is not in the mask list. The error codes on the mask list are stored in the memory 86 for subsequent transmission to the host computer 14 during the next poll. Alternatively, all of the error codes are stored, and the mask list is used to decide which stored codes should be sent to the host computer 14 during the next poll. In the alternative embodiment, the stored error codes which are not on the mask list may be sent in response to a special poll signal, or may be discarded at periodic intervals. Use of the mask 210 results in transmissions of shorter length from the controller 22 to the host computer 14, thereby allowing for faster polling of banks of gaming machines 12. The mask also reduces the amount of data that must be processed by the controller 22 and the host computer 14.

The mask list may also be used to decide which normal report codes to collect, thereby allowing the controller 22 to avoid collecting and/or transmitting normal report codes which are not necessary to be regularly monitored or which are not of interest to the facility.

Polling Protocol

FIGS. 8A–8F, taken together, show a flowchart of the steps for allowing the gaming machines 12 to be polled by the host computers 14. The flowchart is generally self-explanatory, and thus is not described in detail. However, the following general comments are provided to assist in further understanding the flowchart.

Certain reset and archiving functions occur at the top of each hour, week, month and year. One type of reset is to zero out readings. In the flowchart, "counts" refer to pay-in and pay-out information, such as coin in and coin out information.

A "lock file" is provided on the network which interconnects the host computers 14. As discussed above, the lock file is used to ensure that only a single host computer 14 transmits a polling signal over the power line 18 at any instance of time, and that only one controller response is processed as a result of each poll.

Figure 8A:
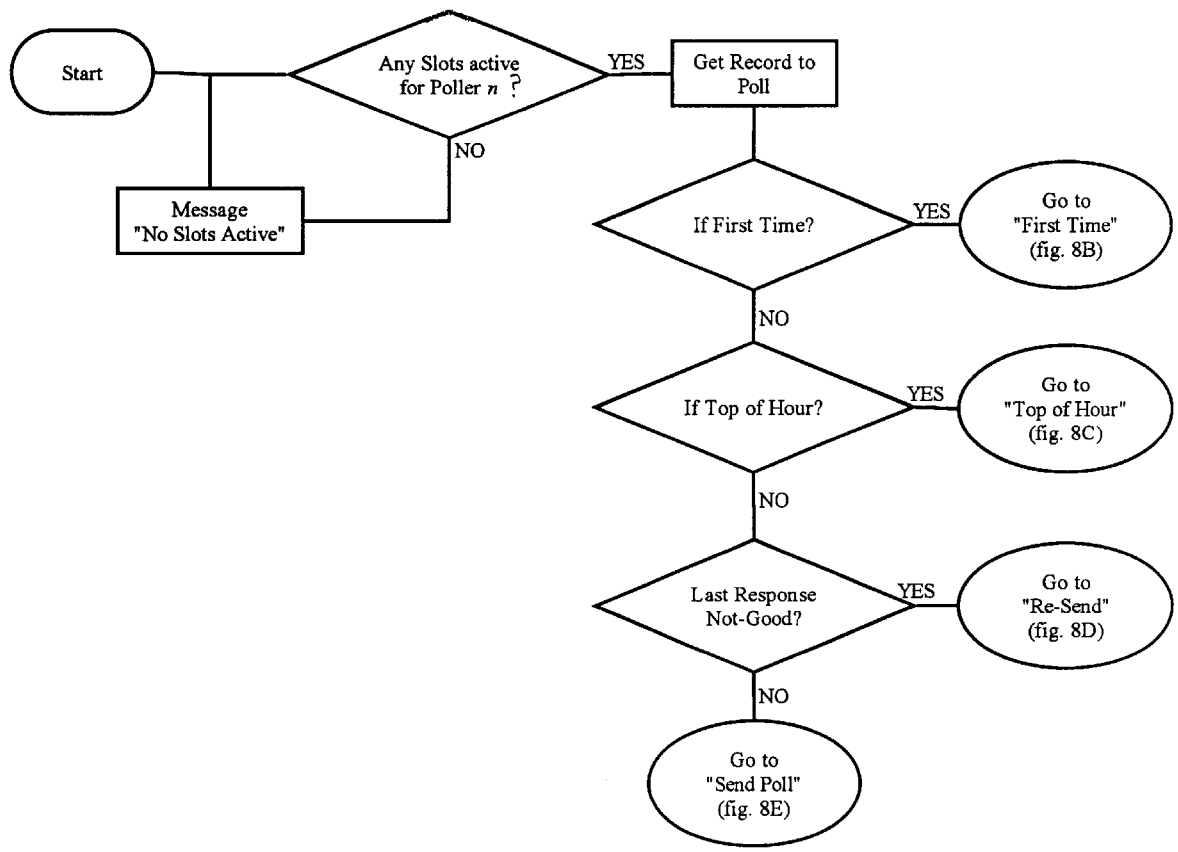
FIGS. 8A–8F, taken together, show a flowchart of the steps for polling the gaming machines by the remote monitoring computers, in accordance with a preferred embodiment of the present invention.
Figure 8B:
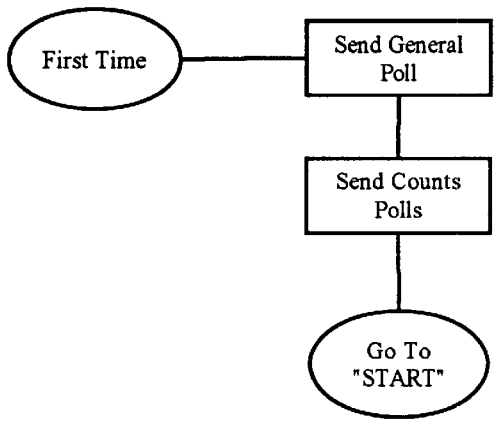
Figure 8C:
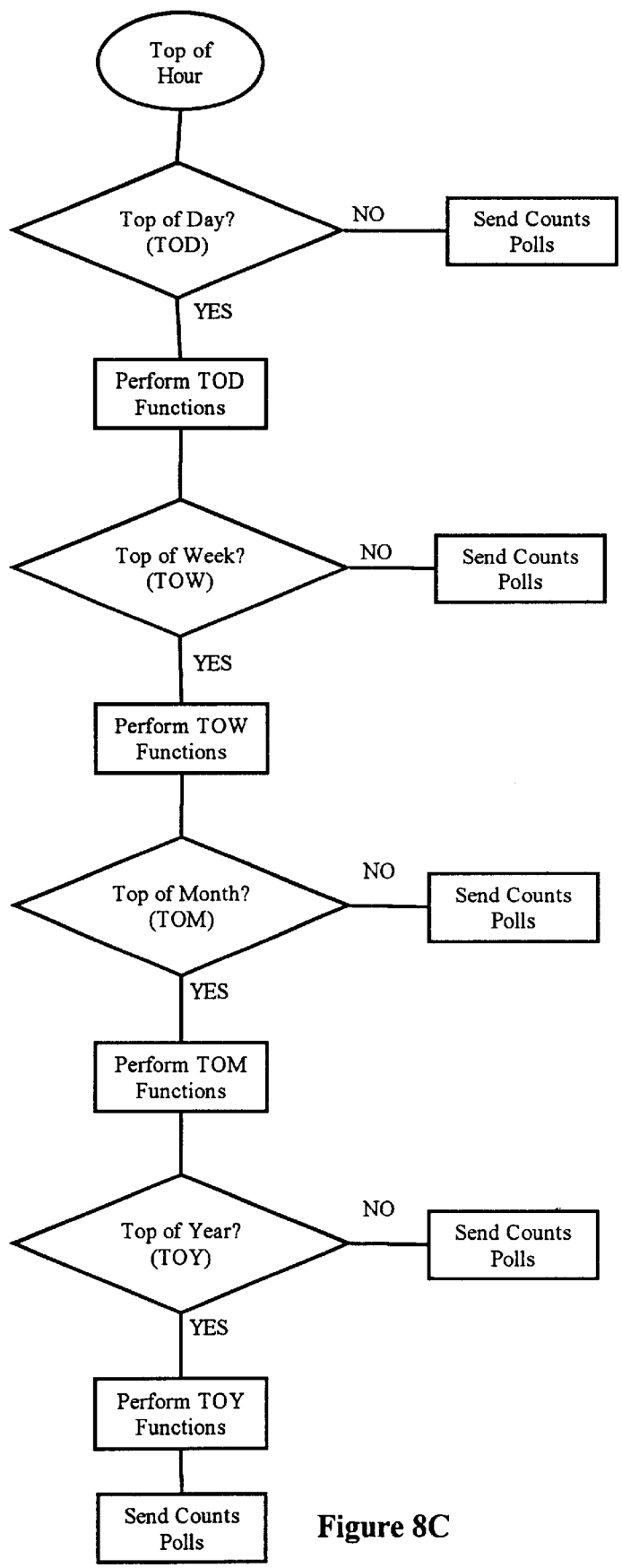
Figure 8D:
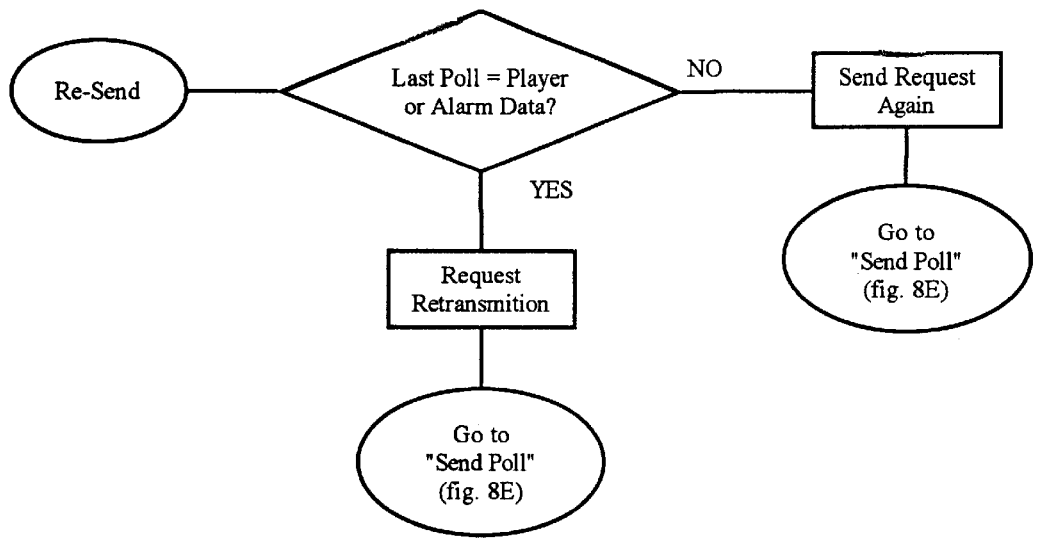
Figure 8E:
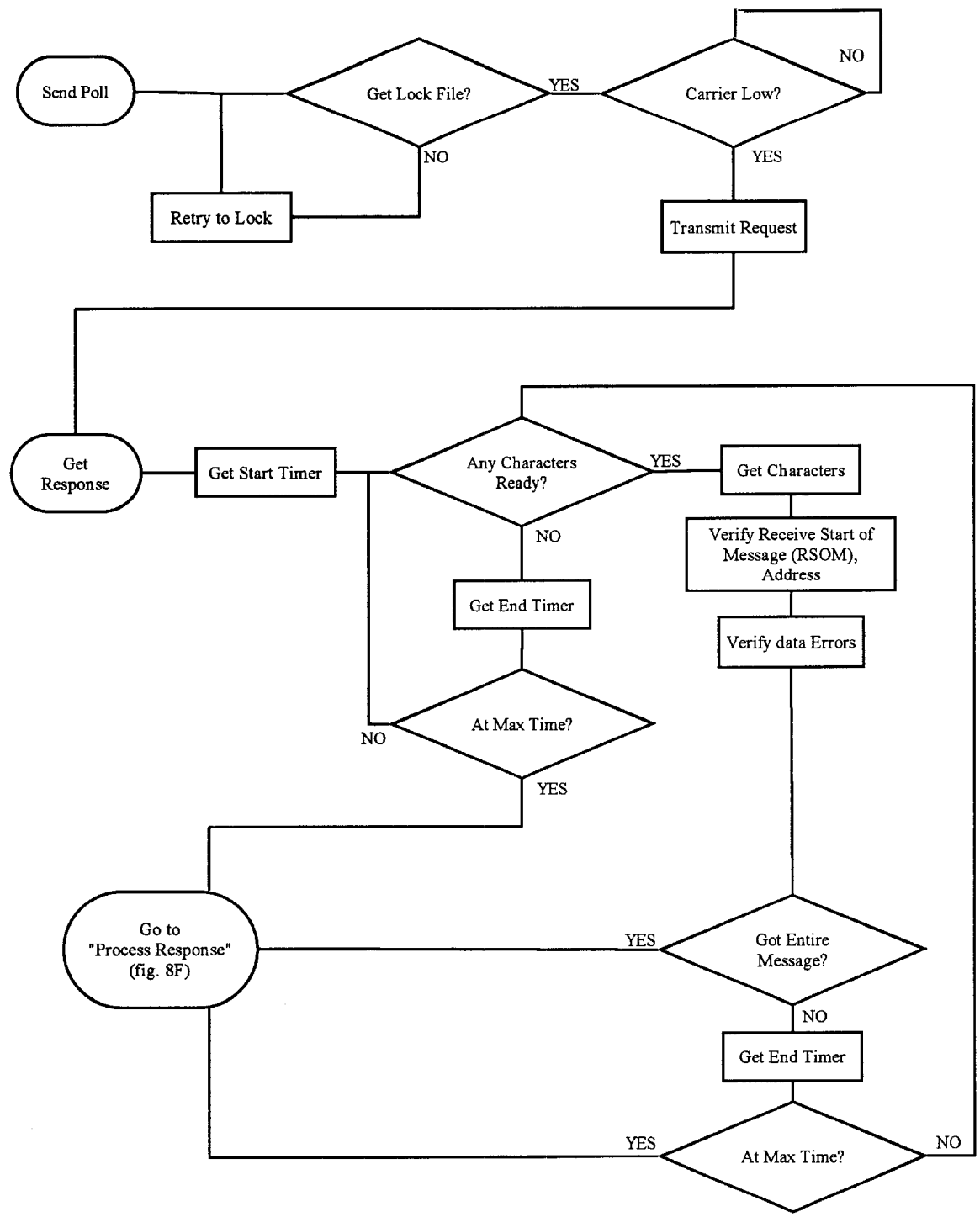

Referring to FIG. 8E, the Receive Start of Message (RSOM) Address is appended to the front end of the controller response.

Figure 8F:
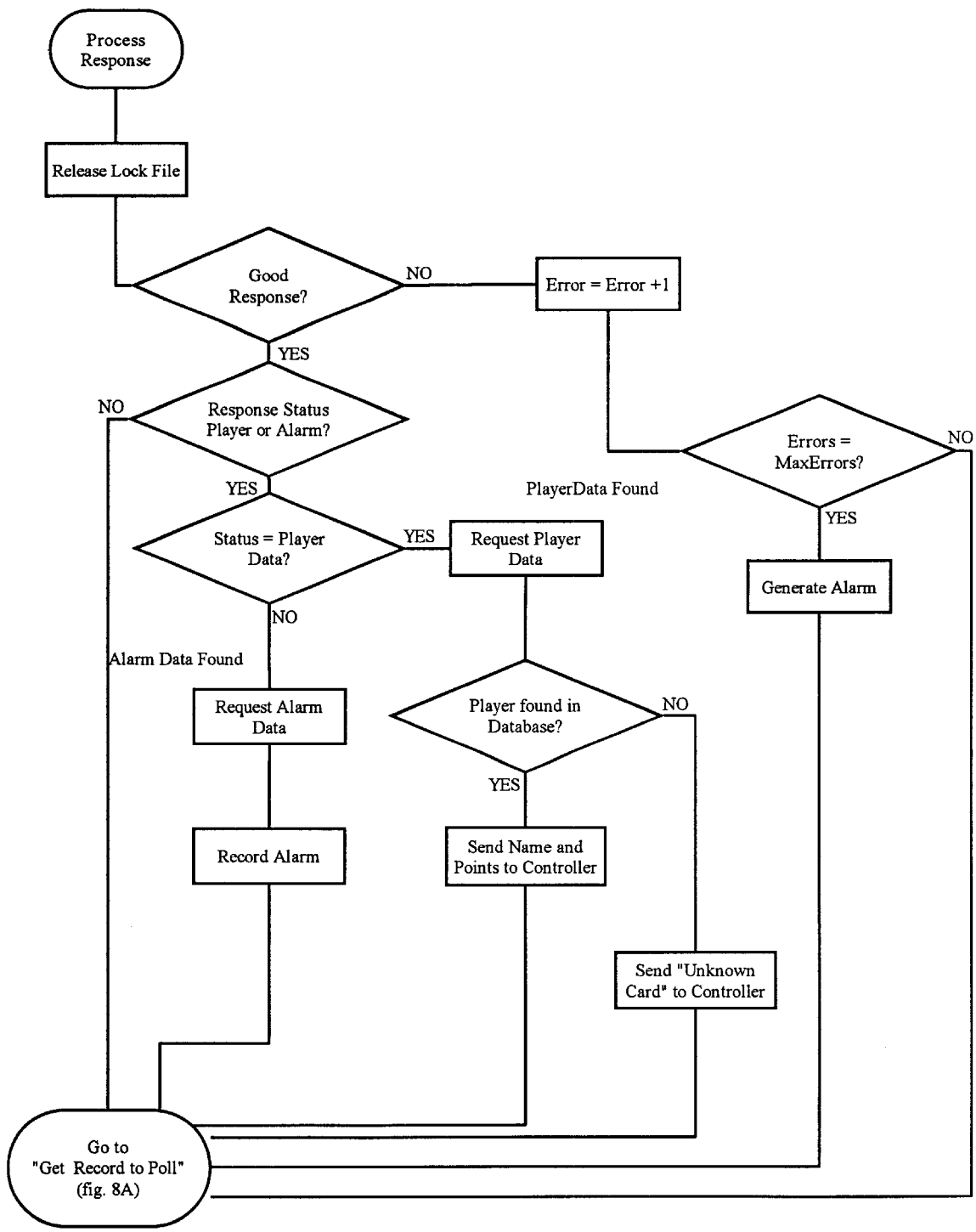

The preferred embodiment of the invention requires a player to use a player identification card to operate a gaming machine 12. In this manner, the gaming facility can more easily facilitate accounting functions and can also collect statistical information about players that may be useful for marketing purposes. The player data referred to in FIG. 8F is related to information obtained from the card.

Details of Communication Protocol

One suitable communication protocol between the gaming machines 12 and the host computers 14 for use with the present invention is shown in the Appendix. The protocol shown in the Appendix is specially designed to minimize byte length, and therefore overall transmission time. For example, the protocol dispenses with many redundant message portions that are used with conventional protocols for communicating with slot machines.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX

```
00  POLL                                                              POLL.S
    Command:   8 bytes = 36.666 ms
    <SYNC><51><STAR ID><01><LRC>
    Response:  9 bytes = 41.250 ms
    <SYNC><52><STAR ID><01><STATUS><LRC>
    Total:     17 bytes = 77.916 ms @ 2400 baud
02  REQUEST RETRANSMISSION                                            REGRXMT.S
    Command:   8 bytes = 36.666 ms
    <SYNC><51><STAR ID><02><LRC>
    Response:  (VARIABLE, 32 bytes worst case)
    <SYNC><52><STAR ID><Previous Data><LRC>
    Total:     40 bytes = 183.333 ms @ 2400 baud
```

APPENDIX-continued

```
03  GET CONTROLLER INFORMATION                                                                           GETINFO.S
    Command:    8 bytes = 36.666 ms
    <SYNC><51><STAR ID><03><LRC>
    Response:   21 bytes = 96.250 ms
    <SYNC><52><STAR ID><03>,STATUS><TYPE><VERSION><S/N><LRC>
    Total:      29 bytes = 132.916 ms @ 2400 baud
04  SET CONTROLLER ID                                                                                    SETID.S
    Command:    19 bytes = 87.083 ms
    <SYNC><51><BROADCAST><04><STAR ID><S/N><LRC>
    Response:   21 bytes = 96.250 ms
    <SYNC><52><STAR ID><04><STATUS><TYPE><VERSION><S/N><LRC>
    Total:      40 bytes = 183.333 ms @ 2400 baud
05  GET HARD COUNTS                                                                                      HARDCNTS.S
    Command:    8 bytes = 36.666 ms
    <SYNC><51><STAR ID><05><LRC>
    Response:   26 bytes = 119.166 ms
    <SYNC><52><STAR ID><05><STATUS><WRAP FLAG><COIN IN><COIN OUT><COIN DROP><GAMES><LRC>
    Total:      34 bytes = 155.833 @ 2400 baud
06  SAVE/GET HARD COUNTS                                                                                 SAVCNTS.S
                                                                                                         GETSCNTS.S
    Command:    8 bytes = 36.666 ms
    <SYNC><51><BROADCAST or STAR ID><06><LRC>
    Response:   26 bytes = 119.166 ms
    <SYNC><52><STAR ID><06><STATUS><WRAP FLAG><COIN IN><COIN OUT><COIN DROP><GAMES><LRC>
    Total:      34 bytes = 155.833 @ 2400 baud
07  RESET WRAP FLAGS                                                                                     RSTWRAP.S
    Command:    9 bytes = 41.250 ms
    <SYNC><51><STAR ID><07><WRAP FLAG><LRC>
    Response:   26 bytes = 119.166 ms
    <SYNC><52><STAR ID><07><STATUS><WRAP FLAG><COIN IN><COIN OUT><COIN DROP><GAMES><LRC>
    Total:      35 bytes = 160.416 @ 2400 baud
08  GET CARD INFORMATION                                                                                 GETCARD.S
    Command:    8 bytes = 36.666 ms
    <SYNC><51><STAR ID><08><LRC>
    Response:   23 bytes = 105.416 ms
    <SYNC><52><STAR ID><08><STATUS><PLAYER ID><WRAP FLAG><TIME PLAYED><COIN IN><COIN OUT><GAMES><LRC>
    Total:      31 bytes = 142.083 @ 2400 baud
09  GET CURRENT CARD INFORMATION                                                                         CURCARD.S
    Command:    8 bytes = 36.666 ms
    <SYNC><51><STAR ID><09><LRC>
    Response:   23 bytes = 105.416 ms
    <SYNC><52><STAR ID><08><STATUS><PLAYER ID><WRAP FLAG><TIME PLAYED><COIN IN><COIN OUT><GAMES><LRC>
    Total:      31 bytes = 142.083 @ 2400 baud
0A  SET CASINO ID                                                                                        SETCID.S
    Command:    11 bytes = 50.416 ms
    <SYNC><51><BROADCAST or STAR ID><0A><ID SELECT><CASINO ID><LRC>
    Response:   12 bytes = 55.000 ms
    <SYNC><52><STAR ID><0A><STATUS><ID SELECT><CASINO ID><LRC>
    Total:      23 bytes = 105.416 ms @ 2400 baud
0B  GET CASINO ID'S                                                                                      GETCID.S
    Command:    8 bytes = 36.666 ms
    <SYNC><51><STAR ID><0B><LRC>
    Response:   29 bytes = 132.916 ms
    <SYNC><52><STAR ID><0B><STATUS><CASINO ID1><CASINO ID2><CASINO ID3><CASINO ID4><CASINO ID5>
    <CASINO ID6><CASINO ID7><CASINO ID8><CASINO ID9><CASINO ID10><LRC>
    Total:      37 bytes = 169.583 ms @ 2400 baud
0C  SET DISPLAY MESSAGE (For Future Use)                                                                 SETDISP.S
    Command:    29 bytes = 132.916 ms
    <SYNC><51><BROADCAST or STAR ID><0C><MODE><MESSAGE><LRC>
    Response:   31 bytes = 142.083 ms
    <SYNC><52><STAR ID><STATUS><MODE><MESSAGE><LRC>
    Total:      60 bytes = 275.000 ms @ 2400 baud
0D  SET HARD COUNTS                                                                                      SETHCNTS.S
    Command:    25 bytes = 114.583 ms
    <SYNC><51><STAR ID><0D><WRAP FLAG><COIN IN><COIN OUT><COIN DROP><GAMES><LRC>
    Response:   26 bytes = 119.166 ms
    <SYNC><52><STAR ID><0D><STATUS><WRAP FLAG><COIN IN><COIN OUT><COIN DROP><GAMES><LRC>
0E  RESET CONTROLLER                                                                                     RESET.S
    Command:    10 bytes = 45.833 ms
    <SYNC><51><BROADCAST or STAR ID><0E><MODE><SYNC COUNT><LRC>
    Response:   11 bytes = 50.416 ms
    <SYNC><52><STAR ID><0E><STATUS><MODE><SYNC COUNT><LRC>
    Total:      21 bytes: 96.250 ms @ 2400 baud
0F  FIND SERIAL NUMBER                                                                                   FINDSN.S
    Command:    18 bytes = 82.500 ms
    <SYNC><51><BROADCAST><0F><S/N><LRC>
    Response:   21 bytes = 96.250 ms
    <SYNC><52><STAR ID><0F><STATUS><TYPE><VERSION><S/N><LRC>
    Total:      39 bytes = 178.750 ms @ 2400 baud
```

APPENDIX-continued

| | | |
|---|---|---|
| 10 | REQUEST ALARM DATA | GETALRM.S |
| | Command:    8 bytes = 36.666 ms | |
| | <SYNC><51><STAR ID><10><LRC> | |
| | Response:    18 bytes = 82.500 ms | |
| | <SYNC><52><STAR ID><10><STATUS><ALARM DATA><PLAYER ID><LRC> | |
| | Total:    26 bytes = 119.166 @ 2400 baud | |
| 88 | GENERATE CARD INFORMATION | GENCARD.S |
| | Command:    22 bytes = 100.833 ms | |
| | <SYNC><51><STAR ID><88><PLAYER ID><WRAP FLAG><TIME PLAYED><COIN IN><COIN OUT><GAMES><LRC> | |
| | Response:    9 bytes = 41.250 ms | |
| | <SYNC><52><STAR ID><88><STATUS><LRC> | |
| | Total:    31 bytes = 142.083 ms @ 2400 baud | |
| 99 | GENERATE ALARM DATA | GENALRM.S |
| | Command:    12 bytes = 55.000 ms | |
| | <SYNC><51><STAR ID><99><ALARM DATA><PLAYER ID><LRC> | |
| | Response:    10 bytes = 45.833 ms | |
| | <SYNC><52><STAR ID><88><STATUS><LRC> | |
| | Total:    22 bytes = 100.833 ms @ 2400 baud | |

INTELLIGENT REPLY TIMEOUT PROCESS:

The following algorithm is used to determine the appropriate timeout value to be used for each command;
TOFACTOR = (1/(baudrate/11))               TOFACTOR = character time
TIMEOUT = (XMIT count + RECV count + 2) TOFACTOR + .07

What is claimed is:

1. A gaming machine controller adapted for communication with a remote host computer via a plurality of different communication media, the controller comprising:

(a) a first connector for attachment to a gaming machine to allow the controller to receive data generated by the gaming machine;

(b) a memory for storing the gaming data; and (c) a data router connected to the memory for communicating the gaming data to the remote host computer, the data router including a programmable device for selectively setting a communication mode therein from a plurality of communication modes to allow the controller to communicate via one or more communication medium selected from the plurality of different communication media.

2. A gaming machine controller according to claim 1 further comprising a modem interface and a hardwired interface, and the communication media include an AC power line and hardwired data lines, the data router causing the gaming data to be routed to the modem interface upon setting the programmable device to a power line mode, the data router causing the gaming data to be routed to the hardwired interface upon setting the programmable device to a hardwired mode.

3. A gaming machine controller according to claim 1 further comprising a modem interface and a hardwired interface, and the communication media include airwaves via radio frequency signals and hardwired data lines, the data router causing the gaming data to be routed to the modem interface upon setting the programmable device to a radio frequency mode, the data router causing the gaming data to be routed to the hardwired interface upon setting the programmable device to a hardwired mode.

4. A gaming machine controller adapted to collect data from a gaming machine, the gaming machine including at least one hard meter which reflects hard counts, the controller comprising:

(a) an input port directly connected to a signal line that is connected to the input of the at least one hard meter, wherein the signal line communicates hard count data, (b) a memory for storing the hard count data received at the input port, and (c) an output port connected to the memory for allowing the hard count data stored therein to be output from the controller and transmitted to a remote computer, the remote computer thereby receiving hard count data obtained directly from the signal line that is connected to the input of the at least one hard meter.

5. A gaming machine controller adapted for communication with a remote host computer, the controller comprising:

(a) an input port for receiving status codes from the gaming machine;

(b) a memory for storing the status codes;

(c) a filter which stores a list of a selectable subset of the status codes which are desired to be transmitted to the remote host computer; and (d) a processor connected to the input port, the filter and the memory for storing the status codes received from the gaming machine which are on the filter list, and for causing the controller to transmit to the remote host computer only the status codes which are on the filter list.

6. A gaming machine controller according to claim 5 wherein the status codes are error codes.

7. A gaming machine controller according to claim 5 wherein the list of status codes which are desired to be transmitted to the remote host computer is received from the remote host computer.

* * * * *